United States Patent [19]

Rahuel et al.

[11] 4,225,750
[45] Sep. 30, 1980

[54] GRAPHICS TABLE PARTICULARLY FOR A TELEWRITING SYSTEM

[76] Inventors: Jean-Claude Rahuel, 12, Square de Tanouarn; Jean-Paul Dagnelie, 7, Quai de la Prévalaye, both of, 35000 Rennes, France

[21] Appl. No.: 966,519

[22] Filed: Dec. 4, 1978

[30] Foreign Application Priority Data

Dec. 21, 1977 [FR] France .............................. 77 39395

[51] Int. Cl.$^2$ ............................................. G08C 21/00
[52] U.S. Cl. ................................................... 178/19
[58] Field of Search ............................ 178/18, 19, 20; 340/347 AD, 146.3 SY; 318/568

[56] References Cited

U.S. PATENT DOCUMENTS

| | | | |
|---|---|---|---|
| 3,992,579 | 11/1976 | Dymerae | 178/19 |
| 3,999,012 | 12/1976 | Dym | 178/19 |
| 4,039,747 | 8/1977 | Muller | 178/19 |
| 4,054,746 | 10/1977 | Kamm | 178/19 |
| 4,080,515 | 3/1978 | Anderson | 178/19 |
| 4,088,842 | 5/1978 | Ikedo | 178/19 |
| 4,138,592 | 2/1979 | Capehart et al. | 178/19 |

FOREIGN PATENT DOCUMENTS 1492730 11/1977 United Kingdom .
1525649 9/1978 United Kingdom .

OTHER PUBLICATIONS

"The Electronic Blackboard", Kegel, Tijdschrift van het Nederlands Elektronica, Jun. 1973, pp. 133-137.
"A Writing Tablet for Converting Current Handwriting into Electrical Signals", Nieuwkerk, Tijdschrift ... Elektronica, Jun. 1973, pp. 139-143.
"The Display of an Electronic Blackboard System", Koudstaal, Tijdschrfit ... Elektronica, Jun. 1973, pp. 145-155.
"Inductive Transducers for Graphical Input Devices", Ivaschenko et al., Sov. Jour. of Inst. & Cont., #8, Aug. 1969, pp. 22-25.

*Primary Examiner*—Thomas A. Robinson
*Attorney, Agent, or Firm*—Laff, Whitesel & Rockman

[57] ABSTRACT

A graphics table comprises a non-conductive plate supporting two crossing layers of wires and a pen for writing on a sheet disposed on the plate. The wires are successively scanned by an electric current which creates a field to be detected by the pen. The electric current has a high frequency, for example of the order of ten megahertz, and the wires are switched at a frequency of for example one hundred kilohertz. The pen is followed by a selective amplifier of ten megahertz, by a filter, by a detector, and by a circuit for determining the time when the picked up signal passes through a peak. The invention is notably useful in a telewriting system.

4 Claims, 1 Drawing Figure

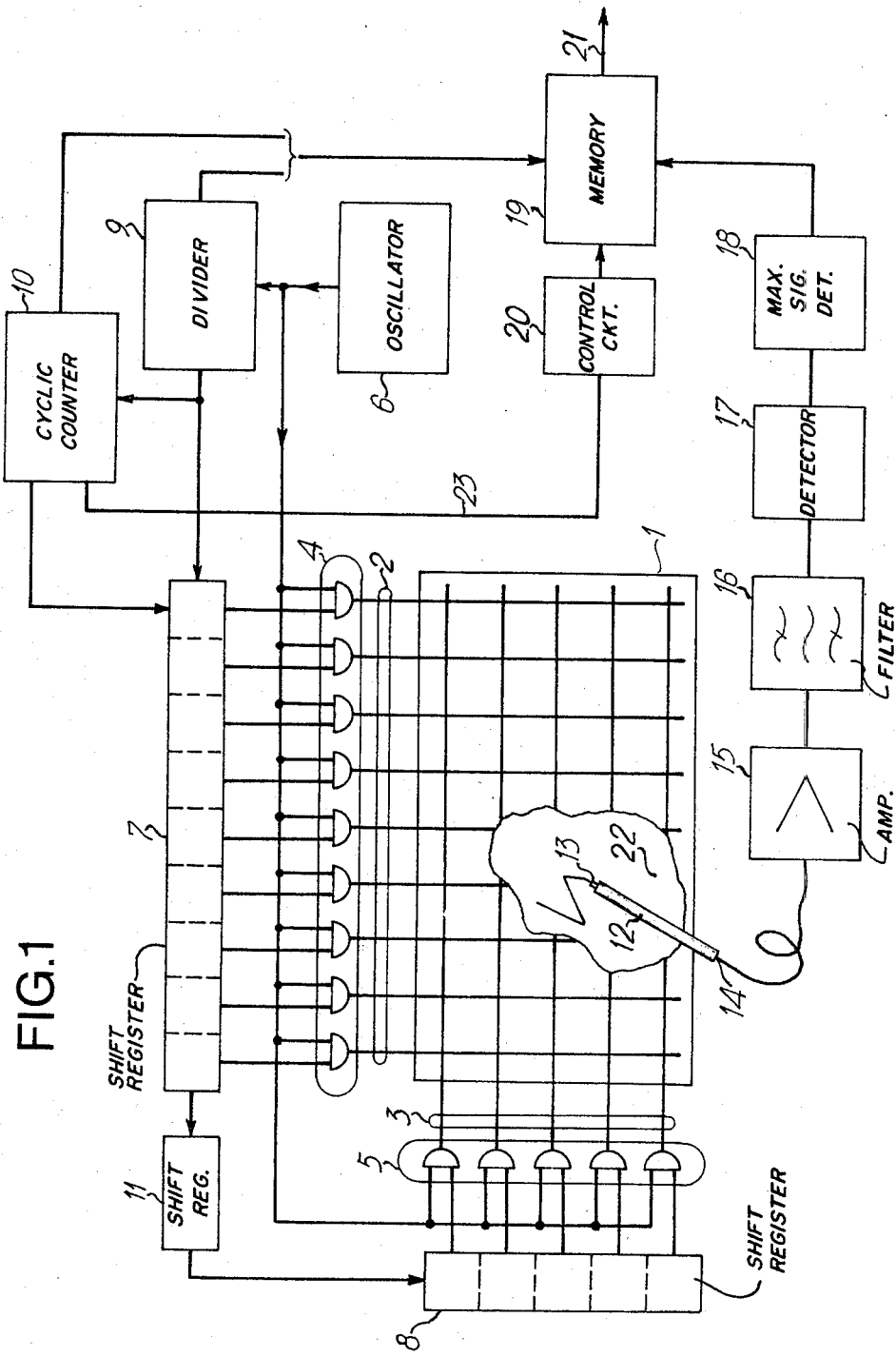

GRAPHICS TABLE PARTICULARLY FOR A TELEWRITING SYSTEM

The present invention relates to a graphics table which is particularly useful in a telewriting system.

From day to day, the importance of and interest in telewriting apparatus is increasing. It will be recalled that a telewriting system consists of graphics acquisition means, connected to a transmission line or channel. Such a system can take various forms such as a graphics table, a light pen, a ball point pen, etc. which moves over coordinates that are periodically scanned. These coordinates are retrieved, then coded and the coding is transmitted via the transmission line or channel to the receiving end, where display means such as cathode ray tubes, plasma panels, tracing tables, special printing machines, etc. are available to display the sketch or written information.

More particularly, this invention relates to a graphics table comprising a non-conductive plate including a set of horizontal wires and a set of vertical wires, all insulated from each other. The wires of one set are sequentially, one by one, scanned by an electric current, then the wires of the other layer are one after the other similarly sequentially scanned by an electric current, and so on. A type of ball point pen is used which allows the writing or the drawing to be made on a sheet of paper covering the non-conductive plate. The aforenoted ball point pen comprises means which are sensitive to the electric field which is built up by the current passing in the aforenoted wires, and which delivers an output signal allowing the derivation of the co-ordinates of the path followed by the ball point pen.

One such graphics table has been described in a technical article entitled "A WRITING TABLET FOR CONVERTING CURRENT HANDWRITING INTO ELECTRICAL SIGNALS", by L. R. Nieuwkerk in the Dutch review "Tijschrift van het Nederlands Elektronica- en Radiogenootschap" 38, No. 6, 1973, pages 139 to 143. In that table, the electric wires scan the horizontal current which limits the amplitude of the signal detected by the ball point pen through the sheet of paper. In other respects and for various reasons, the wire scanning frequency is between 100 and 200 kilohertz and it results in a light noise level which disturbs the signal detected by the pen. The accuracy in the measurement of the co-ordinates is thus limited by the weak signal-to-noise ratio of the apparatus.

One object of the present invention is the provision of a graphics table of this type, but without the drawbacks noted above, in allowing the improvement of the amplitude of the signal received in the pen and particularly the signal-to-noise ratio.

According to a feature of the present invention, there is provided a graphics table comprising a non-conductive sheet supporting two crossing sets of wires and a pen capable of writing on a sheet of paper placed on the non-conducting sheet. The wires of one set, then the wires of the other set are successively scanned by an electric current of high frequency. The pen comprises the means for reception of an electric field built up by the electric current scanning the two sets of wires, successively.

According to another feature, the frequency of the current applied to the wires is of the order of about 10 meagahertz, the wire scanning frequency being of the order of about one hundred kilohertz.

According to another feature, the signal which is picked up by the pen is detected in a coherent detection process.

According to another feature, the signal detected by the pen is amplified in a selective amplifier of which the passband is centered at the frequency of the current applied to the wires.

The above mentioned features of the present invention, as well as others, will become clear in the following description of an embodiment, the said description having been made in relation to the diagram of the graphics table shown in the single accompanying FIGURE.

The graphic table of the single FIGURE is comprised of a non-conductive plate 1, which is preferably a printed circuit board supporting a set of vertical, regularly spaced wires 2 on one face and, on the other face, a set of horizontal wires 3 equally regularly spaced, the spaces between the wires of one or the other set being equal. Each wire 2 is connected to the output of an electronic switch or AND gate 4 while each wire 3 is connected to the output of an electronic switch or AND gate 5. Each AND gate 4 has one input connected to the output of an oscillator 6 and the other input connected to the output of a corresponding stage of a shift register 7, comprising as many stages as there are wires 2. Each AND gate 5 has one input connected to the output of oscillator 6 and the other input connected to the output of the corresponding stage of a shift register 8, comprising as many stages as there are wires 3. The input shift register 7 is connected to the output of a counter-divider or divider 9 while the data input of its first stage is connected to the reset output of a cyclic counter 10. Between the last stage of register 7 and the first stage of register 8, is inserted a third shift register 11 comprising a reduced number of stages. In practice, the registers 7, 11 and 8 are connected in series and operate as a single shift register, that is to say that the bit "1", which is introduced into the first stage of shift register 7, when the reset output of cyclic counter 10 is activated, is successively shifted through registers 7, 11 and 8 to the output of the last stage of register 8, at the rate of the clock pulses provided by divider 9.

Counter 10 has its counting input connected to the output of divider 9. The graphics table is also comprised of a pen 12, which is in practice constituted by a section of coaxial cable which is open at its end near table 1, such as to constitute a field pick up. At that end 13, the sensor can be slightly projected out for connection to an external conductor to improve the effectiveness of the pick up. At the other end 14, the coaxial section is extended to the input of an amplifier 15, of which the output is connected to the input of a passband filter 16, of which the output is connected to the input of a detector 17. The output of detector 17 is connected to the input of circuit 18 which is designed to determine the instant when the signal coming from 17 passes through a maximum and to provide a signal at that instant. The output of circuit 18 is connected to the write input of a memory 19 of which the data input is connected to the count outputs of counters 9 and 10. Memory 19 can be cyclically read under the control of control circuit 20. Data read out responsive to circuit 20 is delivered to a communication line 21.

The end 13 of pen 12 is provided with a pencil lead or an inked ball allowing the user who is drawing or writing on a sheet of paper 22 applied on plate 1, to see what he writes as with an ordinary pen.

In the embodiment described, the oscillator 6 provides a signal at a frequency of 10 megahertz and divider 9 has a division ration equal to one hundred. As a result divider 9 provides a continuous train of clock pulses at the repetition frequency of one hundred kilohertz. Wires 2 and 3 are scanned, when their supply AND gates 4 and 5 are on, by a 10 megahertz signal instead of a continuous current as in the graphics table described in the technical article mentioned above.

One can suppose that at the initial instant, counter 10 attains its maximum count for which the reset output applies a bit "1" to the first stage of shift register 7. The first gate 4 is on and the 10 megahertz signal is applied to the first wire 2. As the following clock pulse is received from divider 9, the bit "1" is shifted into the second stage of register 7 and the 10 megahertz signal is applied to the second vertical wire 2, and so on. When all of the vertical wires 2, that is to say all the stages of register 7, have been successively scanned, the bit "1" passes into the shift register 11.

The shift register 11 comprises a few stages only and is used for clearly separating the scanning of vertical wires 2 and the scanning of horizontal wires 3.

Therefore, from the output of register 11, the bit "1" passes into the shift register 8, which provides the successive supply of a signal at 10 Megahertz to horizontal wires 3. Then bit "1" leaves the last stage or cell of register 8, a little ahead of the counter 10 attaining its maximum count. In effect, the maximum count of 10 is equal to the number of stages v of register 7, plus the number of stages k of register 11, plus the number of stages h of register 8, and an arbitrary constant k'.

During the application of the 10 megahertz signal to a wire 2 or 3, it radiates an electromagnetic field which is partly picked up by the pen 12, through the sheet 22 on which pen 12 is being applied at the instant of writing. The signal picked up by pen 12 is applied to amplifier 15 depending on the distance between the end 13 of pen 12 and the radiating wire 2 or 3. Theoretical considerations relating to the interpretation of the signals received by the pen have been given in the technical article already cited, notably on the subject of the interpretation of the position of the end of the pen between two wires. These considerations described with respect to a DC table, are still valid for a high frequency table because they do not involve the frequency of the signal applied to the wires. In short, it is recalled that the utilized signal results from the sampling that virtually shifts at a constant speed on the table or plate 1, either horizontally or vertically. The sampling is carried out at a frequency that is twice the maximum frequency of the bell-shaped signal which is virtually shifted to satisfy Shannon's law. The samples are stored on a capacitor for reconstituting the signal, the capacitor being formed by the input impedance of amplifier 15. The width at mid-height of the bell shaped curve is equal to a/v where a is the distance between the wires 2 or 3 and v is the effective speed of shifting determined by the pulse frequency of shift registers 7 or 8, i.e. 100 kilohertz. The signal is amplified in amplifier 15, then filtered in passband filter 16 which has a passband width of 200 kilohertz and is centered at 10 megahertz. It should be noted that, in this manner, the low frequency noise that is obtained in the current table of the technical article cited above is eliminated.

The output signal of filter 16 is detected in detector 17, which delivers the bell shaped signal. It should be noted that detector 17 can be a coherent detector the reference input of which is then taken from the output of oscillator 6 for causing a synchronous detection which again improves the signal-to-noise ratio. The maximum signal determination circuit 18 can be a conventional differentiation circuit associated with a conventional zero crossing detector which allows the determination of the time when the bell-shaped signal provided by detector 17 passes through its maximum.

In the memory 19, the signal received from the maximum signal detector detector 18 is a write order which initiates a write operation of the contents of cyclic counter 10 into memory 19 and, at the same time, a write operation in memory 19 of the contents of the counter-divider 9. It will become apparent that the content of cyclic counter 10 at the maximum time indicates the number of the radiating wire 2 or 3 while the contents of divider 9 that can vary from 0 to 99 gives the distance of the end 13 to that wire.

The memory 19 is cyclically read under the control of circuit 20 and it delivers its contents to line 21. The read control circuit 20 can be operated from cyclic 10 through the current path 23 during the count of the last k' pulses at the end of each cycle.

It will be understood that the use of a supply current at 10 megahertz provides many advantages over a DC supply. In the first place, the capacitor constituted by the pen tip, the paper 22, the dielectric of plate 1, and the radiating wire has much lower impedance. Therefore with equal peak voltage, the voltage picked up in the coaxial structure of the pen has an improved signal-to-noise ratio. The spectrum of the received signal is symmetrical around 10 megahertz which allows the provision of a simple structure for the amplifier 15. The low frequency noises are eliminated. Finally, by use of a coherent detection, it becomes possible to increase the distance between the wires of the plate and/or to increase the dimensions of the plate.

What is claimed is:

1. A graphics table comprising a non-conductive plate means carrying two orthogonally oriented sets of wires and a coaxial pen means capable of picking up electrical signals and of writing on a sheet of paper placed on the non-conducting plate, means for successively scanning the wires of one set and of the other by an electric current, and said pen comprising reception means for a field created by the electric current successively applied to the wires during the scanning of the sets of wires, characterized in that said electric current has a high frequency in the order of ten megahertz, the scanning frequency of said wires being in the order of one hundred kilohertz.

2. A graphics table according to claim 1, characterized in that the signal picked up by the pen is applied to coherent detector means.

3. A graphics table according to claim 1, characterized in that the signal picked up by the pen is amplified in a selective amplifier means having a passband centered at the frequency of the current applied to said wires.

4. A graphics table according to one of claims 1 to 3, characterized in that it is comprised of oscillator means for delivering a high frequency output signal, electronic switching means for sequentially applying said oscillator output signal to the wires of the sets, a first counter-divider means for providing control pulses to said switching means, a maximum signal detector means connected to a detector means which is connected to receive signals picked up by said pen, said maximum signal detector means causing said first counter-divider means to be read each time that the signal which is picked up by said pen means through its maximum signal strength.

* * * * *